US012394396B2

(12) United States Patent
Shiraishi et al.

(10) Patent No.: US 12,394,396 B2
(45) Date of Patent: Aug. 19, 2025

(54) KEYBOARD INSTRUMENT, KEY BASE MOLDING METHOD, AND KEY BASE MOLDING MOLD

(71) Applicant: CASIO COMPUTER CO., LTD., Tokyo (JP)

(72) Inventors: Yasushi Shiraishi, Ome (JP); Hirokazu Taniguchi, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 220 days.

(21) Appl. No.: 18/133,228

(22) Filed: Apr. 11, 2023

(65) Prior Publication Data

US 2023/0351983 A1 Nov. 2, 2023

(30) Foreign Application Priority Data

Apr. 28, 2022 (JP) ................................ 2022-074166

(51) Int. Cl.
*G10C 3/12* (2006.01)

(52) U.S. Cl.
CPC ..................................... *G10C 3/12* (2013.01)

(58) Field of Classification Search
CPC ........................................................ G10C 3/12
See application file for complete search history.

(56) References Cited

U.S. PATENT DOCUMENTS 6,774,294 B2 * 8/2004 Kugimoto ................ G10C 3/12 84/440
7,129,404 B2 * 10/2006 Inoue ....................... G10C 3/12 84/439
7,608,772 B2 * 10/2009 Kato ........................ G10C 3/12 84/439
8,921,676 B2 * 12/2014 Iwase ..................... G10H 1/346 84/433
2004/0123728 A1 * 7/2004 Inoue ....................... G10C 3/12 84/719
2005/0204907 A1 * 9/2005 Izutani ..................... G10C 3/12 84/745
2005/0235804 A1 * 10/2005 Inouye ..................... G10C 3/12 84/236
2008/0257132 A1 10/2008 Kato
2023/0351983 A1 * 11/2023 Shiraishi .................. G10C 3/12
2024/0112659 A1 * 4/2024 Kito ....................... G10H 1/346

FOREIGN PATENT DOCUMENTS

JP H06068088 U 9/1994
JP 2008268654 A 11/2008
JP 2014191255 A 10/2014

OTHER PUBLICATIONS

Japanese Notice of Reasons for Refusal (and an English language translation thereof) dated Apr. 2, 2024, issued in counterpart Japanese Application No. 2022-074166.
Japanese Notice of Reasons for Refusal (and an English language translation thereof) dated Jun. 18, 2024, issued in counterpart Japanese Application No. 2022-074166.

* cited by examiner

*Primary Examiner* — Robert W Horn
(74) *Attorney, Agent, or Firm* — Holtz, Holtz & Volek PC

(57) ABSTRACT

A keyboard instrument includes a key which includes a weight, and a key base including a top plate and at least one rib configured to fix the weight by holding the weight from below in such a state that the weight is kept in abutment with a lower surface of the top plate.

10 Claims, 13 Drawing Sheets

KEYBOARD INSTRUMENT, KEY BASE MOLDING METHOD, AND KEY BASE MOLDING MOLD

CROSS-REFERENCE TO RELATED APPLICATION

This patent application is based upon and claims the benefit of priority under 35 USC 119 to Japanese Patent Application No. 2022-074166 filed on Apr. 28, 2022, the entire disclosure of which, including the specification, claims, drawings and abstract, is incorporated herein by reference in its entirety.

BACKGROUND

Technical Field

The present disclosure relates to a keyboard instrument, a key base molding method, and a key base molding mold.

Description of the Related Art

There have conventionally been disclosed keyboard instruments in which a weight is provided in a key base as a counterweight to obtain an appropriate feeling of heaviness when a key is depressed. For example, Japanese Unexamined Patent Application Publication No. 2008-268654 (JP-A-2008-268654) discloses a keyboard instrument in which a rectangular parallelepiped weight elongated in a front-back direction of a key is accommodated in a key base including a slit-shaped opening portion provided only in a lower surface side of the key base in such a manner as to be elongated in the front-back direction. A black key including this key base is formed through insert molding.

SUMMARY

According to an aspect of the present disclosure, there is provided a keyboard instrument including a key including a weight and a key base including a top plate and at least one rib configured to fix the weight by holding the weight from below in such a state that the weight is kept in abutment with a lower surface of the top plate.

According to another aspect of the present disclosure, there is provided a key base molding method including inserting a weight in a weight inserting portion provided in a core mold of a mold to dispose the weight in place in the weight inserting portion, clamping the core mold and a cavity mold of the mold together, and injecting a molten resin into the mold so clamped to mold a key base including a rib configured to fix the weight.

According to a further aspect of the present disclosure, there is provided a key base molding mold including a cavity provided in a cavity mold, and a core block provided in a core mold, wherein the core block includes a weight inserting portion including a rib molding portion, wherein the weight inserting portion is formed into a recess having a shape of a frustum in which a base side having a larger surface area is disposed outwards of the recess, and wherein the rib forming portion is formed into a groove extending from an outer circumferential surface of the weight inserting portion having the shape of the frustum to a base side having a smaller surface area.

DESCRIPTION OF THE EMBODIMENT

Figure 1:
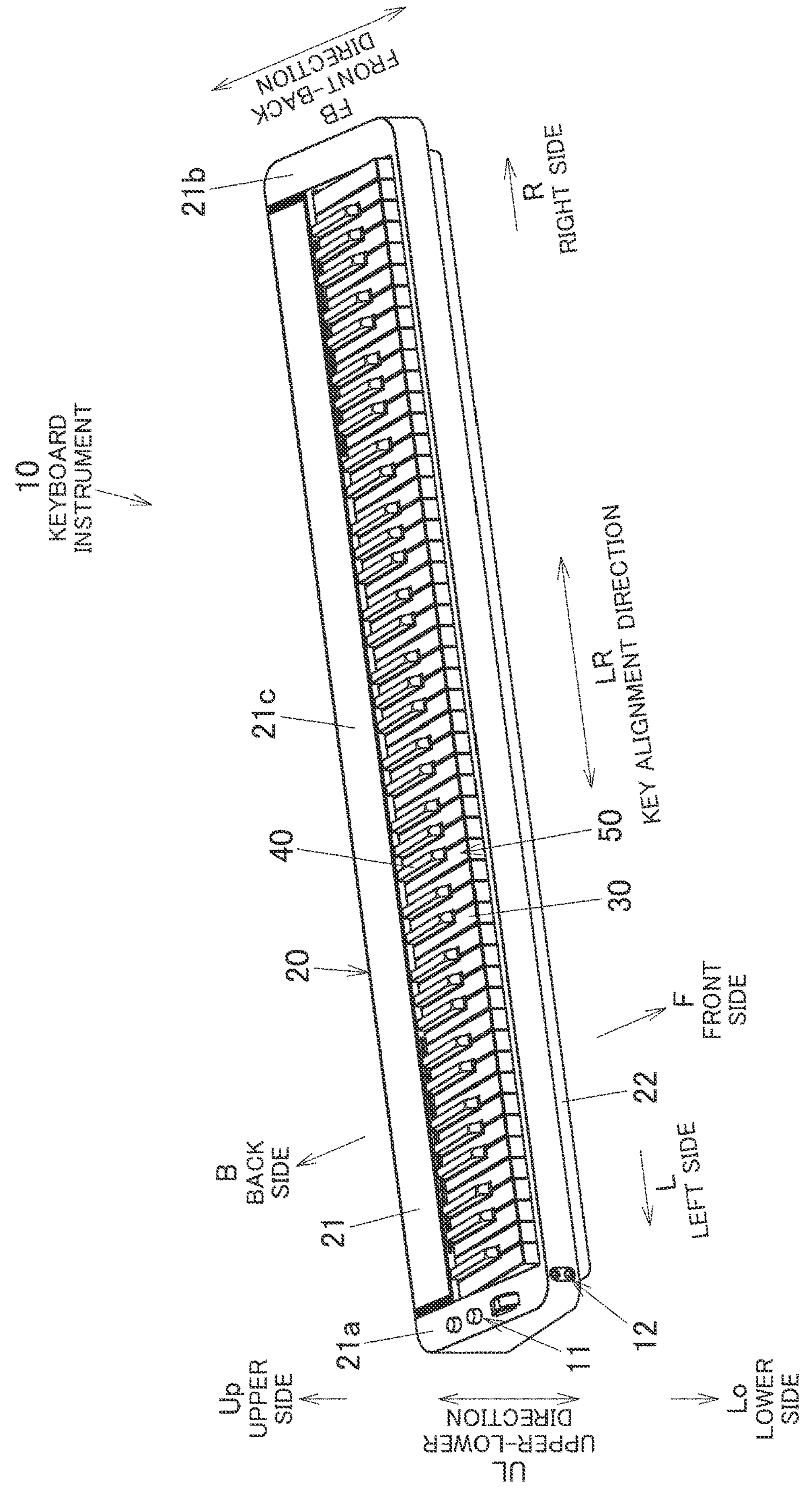
FIG. 1 is a perspective view showing a keyboard instrument according to an embodiment of the present disclosure.

Hereinafter, an embodiment of the present disclosure will be described based on drawings. A keyboard instrument 10 shown in FIG. 1 includes a full-scale (88-note) keyboard 50 including plural white keys 30 and plural black keys 40, which make up a large number of keys or 88 keys of the keyboard 50, and a case 20. In the following description, a front to the keys in the keyboard 50 in a front-back direction FB is referred to as a front side F, and a rear or back to the keys in the keyboard 50 in the front-back direction FB is referred to as a back side B. When facing the keyboard 50 from a front side F thereof, a left of the keyboard 50 is referred to as a left side L, and a right of the keyboard 50 is referred to as a right side R. In the keyboard 50, the keys are aligned in a left-right direction, which is referred to as a key alignment direction LR. When viewing the keyboard instrument 10 in an upper-lower direction UL thereof, an upper side is referred to as an upper side Up, and a lower side is referred to as a lower side Lo. In the present embodiment, while the keyboard instrument 10 is described as an electronic piano, the present disclosure may be applied to any other keyboard instruments as long as they are a musical instrument configured to produce notes in response to key depressing operations by a player (a user).

The case 20 has substantially a rectangular plate shape whose longitudinal direction follows the left-right direction. The case 20 is divided into an upper case 21 and a lower case 22. The upper case 21 and the lower case 22 are each formed from a resin material. A circuit board, a battery functioning as a power supply, and the like are accommodated inside the case 20. A control section 11 including a knob and a dial for volume control and various types of settings is provided on a left-hand side upper surface 21*a* of the upper case 21. In addition, an earphone jack 12 is provided in a left-hand side front surface of the upper case 21.

The upper surface 21*a* of the upper case 21 which lies adjacent to the keyboard 50 at a left side of the upper case 21 and an upper surface 21*b* of the upper case 21 which lies adjacent to the keyboard 50 at a right side of the upper case 21 are both formed into an inclined surface which is inclined obliquely downwards from a back side towards a front side of the upper case 21. In addition, an upper surface 21*c*, which is provided at a central upper portion of the upper case 21 in such a manner as to be long in the left-right direction, is also formed into an inclined surface which is inclined similarly. Although not shown, a hole portion is provided in a back side of the upper case 21 in such a manner as to correspond to a speaker.

Figure 2:
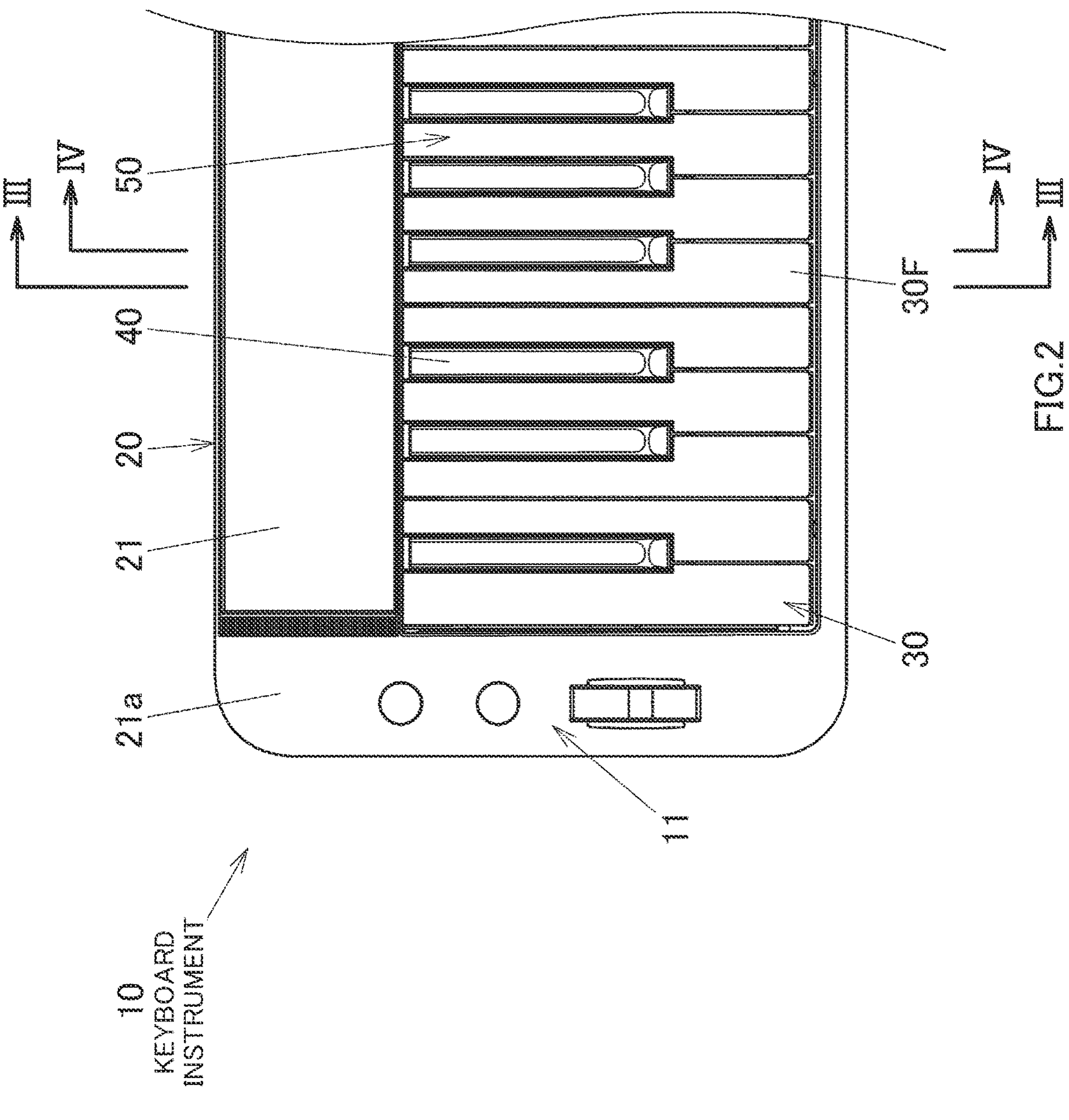
FIG. 2 is a plan view of a left side of the keyboard instrument according to the embodiment of the present disclosure, showing the relevant part in an enlarged fashion.

As shown in FIG. 2, the plural black keys 30 are provided in such a manner as to match a scale of notes A to F. In the following description, while a white key for a note F (a white key 30F) will be described as representing the plural white keys 30, the present disclosure can also be applied to the remaining white keys 30 for the remaining notes in the scale of notes A to F. On the other hand, all the black keys 40 have the same shape.

Figure 3B:
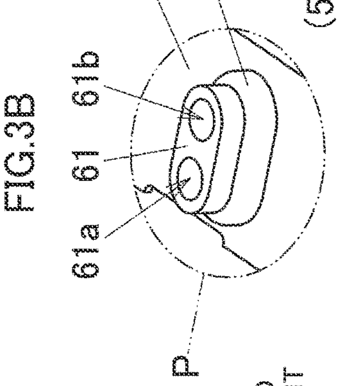
FIG. 3B is a circled enlarged view of a portion P in FIG. 3A, that is, a perspective view of the portion P as viewed from above.
Figure 3A:
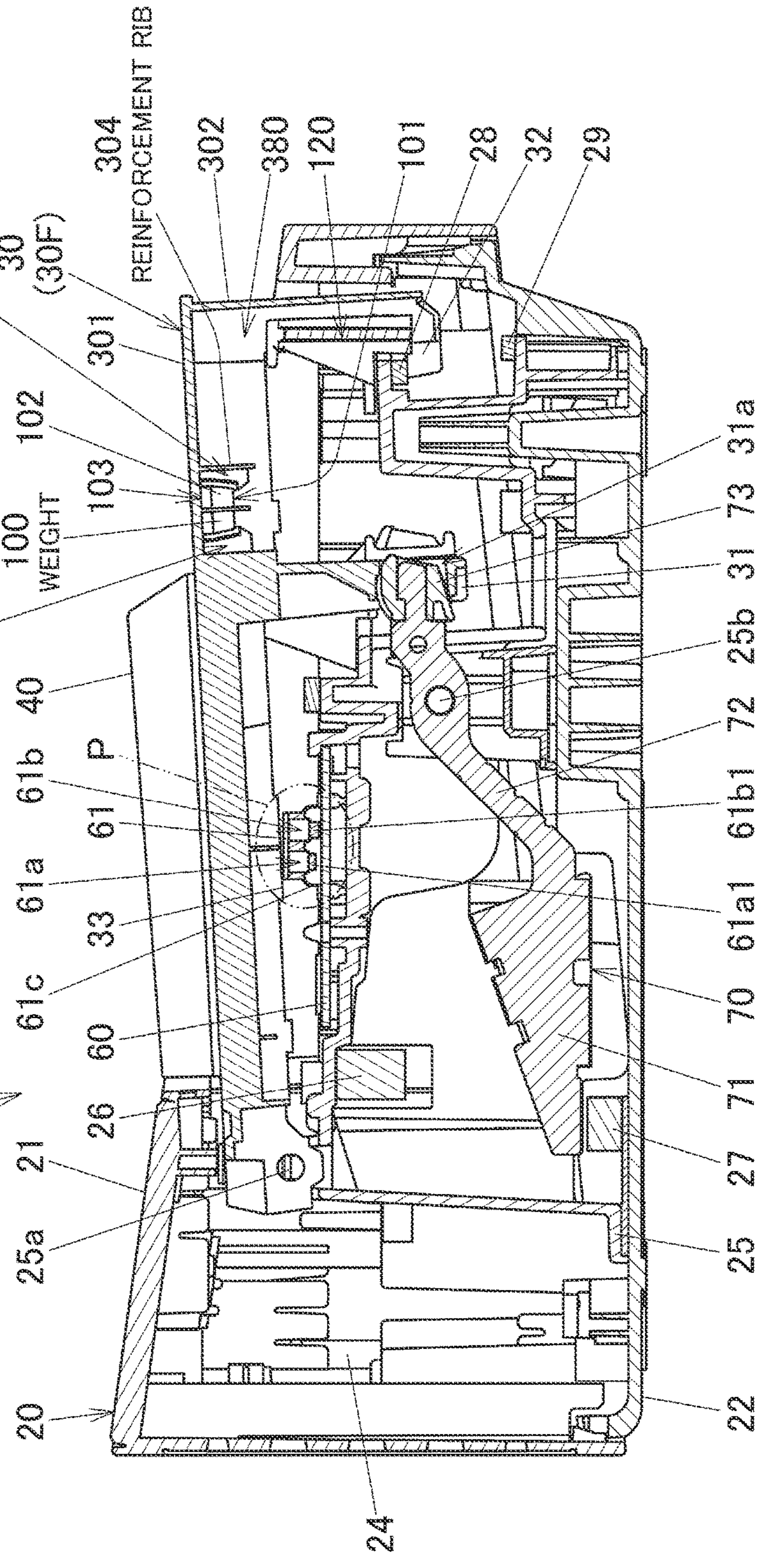
FIG. 3A is a sectional view of the keyboard instrument according to the embodiment of the present disclosure, taken along a line III-III in FIG. 2.
Figure 4:
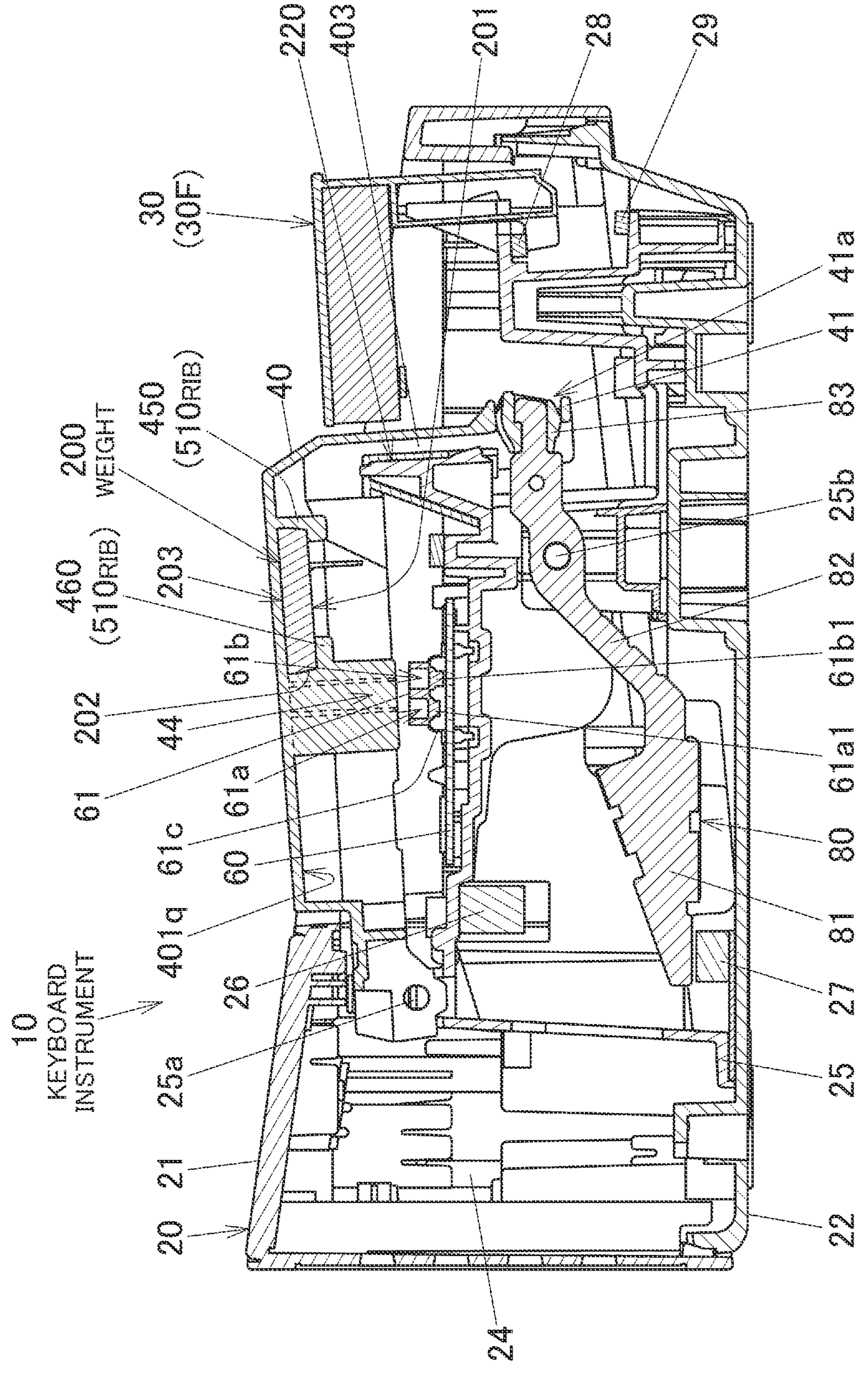
FIG. 4 is a sectional view of the keyboard instrument according to the embodiment of the present disclosure, taken along a line IV-IV in FIG. 2.

As shown in FIG. 3A showing a section of the white key 30 and FIG. 4 showing a section of the black key 40, the upper case 21 and the lower case 22 are assembled together into the case 20 by, for example, thread joining together a lower boss portion set upright upwards from the lower case 22 and an upper boss portion 24 set upright downwards from the upper case 21 with a bolt. An inner case 25 is provided inside the case 20. The inner case 25 is formed long in the key alignment direction LR, and in the sectional views in FIGS. 3A and 4, the inner case 25 has substantially a U-shaped section in which the inner case 25 is opened towards the lower side Lo. A circuit board 60 is provided on an upper surface of the inner case 25. Plural switched 61 are provided on the circuit board 60 in such a manner as to correspond to the plural white keys 30 and black keys 40 so as to detect a key depression.

Also, as shown in FIG. 3B, which is a circled enlarged view of a portion P in FIG. 3A, that is, a perspective view of the portion P as viewed from above, the switch 61 is provided substantially as a rectangular parallelepiped which is elongated in a front-back direction FB of the key. Corners of the switch 61 are rounded, as a result of which the switch 61 has semi-circular arc-shaped ends. The switch 61 is formed from an elastic material such as a rubber material. Circular holes are provided in an upper surface of the switch 61 so that a back pressing portion 61*a* and a front pressing portion 61*b* are provided. The back pressing portion 61*a* and the front pressing portion 61*b* are each formed into a bottomed circular recess and have bottom portions 61*a*1, 61*b*1, respectively. The bottom portion 61*b*1 of the front pressing portion 61*b* is formed longer or thicker towards the lower side Lo than the bottom portion 61*a*1 of the back pressing portion 61*a*. Additionally, a thin and flexible annular deforming portion 61*c* is provided on a lower side Lo of the switch 61. Two switch contacts (not shown) are provided on the circuit board 60 in such a manner as to correspond to the respective bottom portions 61*a*1, 61*b*1 of the back pressing portion 61*a* and the back pressing portion 61*b*. When the two switch contacts are depressed simultaneously, a key depression is detected, whereby a predetermined note is made. The configuration of the switch 61 is common for the white key 30 and the black key 40.

As shown in FIGS. 3A and 3B, a switch pressing portion 33 is provided in the white key 30 in a position corresponding to the switch 61 for the relevant white key 30. A support shaft 25*a* is provided at the back of the inner case 25 so as to support the white key 30 rotatably. Plural support shafts 25*a* are provided in such a manner as to correspond to the plural white keys 30 and black keys 40. Plural hammer members 70 are provided inside the inner case 25. Each hammer member 70 includes a weight portion 71 provided on a back side B thereof. An arm portion 72 extends from the weight portion 71 towards the front side F and is rotatably supported by a support shaft 25*b* provided inside the inner case 25.

A hammer cap 73 is provided at a distal end of the arm portion 72 so as to be brought into engagement with a hammer pressing portion 31 which extends from the white key 30 towards the lower side Lo. A hole portion 31*a* is provided in the hammer pressing portion 31 so that the hammer cap 73 is brought into engagement therewith. A hook-shaped restricting projection 32 is provided at a front end portion of the white key 30 in such a manner as to extend towards the lower side Lo and then to project towards the back side B at a distal end portion thereof. As will be described later, the restricting projection 32 has a left plate-shaped restricting projection 32*a* and a right plate-shaped restricting projection 32*b*. A white key guide portion 120 is provided at a front end portion of the inner case 25 in such a manner as to lie between the left restricting projection 32*a* and the right restricting projection 32*b*. The white key guide portion 120 slides on inner surfaces of the left restricting projection 32*a* and the right restricting projection 32*b* so as to guide a movement of the restricting projection 32 in the upper-lower direction UL. As a result, when the white key 30 is depressed, a lateral oscillation of the relevant white key 30 in the key alignment direction LR is reduced.

As shown in FIG. 4, the black key 40 includes a switch pressing portion 43 provided for the switch 61 for the relevant black key 40. Additionally, hammer members 80 are also provided individually for the black keys 40. The hammer members 80 for the black keys 40 also each include a weight portion 81, an arm portion 82, and a hammer cap 83. The hammer cap 83 is in engagement with a hole portion 41*a* formed in a hammer pressing portion 41 provided on the black key 40. As will be described later, the hammer pressing portion 41 of the black key 40 includes left and right side plates 403 which are provided in such a manner as to extend downwards. A black key guide portion 220 is provided inside the inner case 25 in such a manner as to lie between the left and right side plates 403 so extending. The black key guide portion 220 slides on respective inner surfaces of the left and right side plates 403 so extending so as to guide a movement of the black key 40 in the upper-lower direction UL. As a result, when the black key 40 is depressed, a lateral oscillation of the relevant black key 40 in the key alignment direction LR is reduced.

When the white key 30 is depressed, the hammer pressing portion 31 of the white key 30 depresses the hammer cap 73. Then, the weight portion 71 of the weight member 70, which is provided opposite to the hammer cap 73 across the support shaft 25*b*, is raised. In this way, the player or user can depress the white key 30 while feeling a sensation of heaviness that is like to a sensation of heaviness that the player or user feels when he or she plays a real piano, not an electronic keyboard instrument. Then, the weight portion 71 so raised is brought into abutment with an upper cushion 26 provided for the relevant hammer member 70.

On the other hand, the restricting projection 32 is pushed downwards as a result of the depression of the white key 30, whereby the restricting projection 32 is brought into abutment with a lower cushion 29 provided in such a manner as to correspond to the relevant restricting projection 32. In addition, when the white key 30 is depressed, the switch 61 is depressed by the switch pressing portion 33 provided on the relevant white key 30, whereby a note is made which corresponds to the white key 30 so depressed. Then, when the player or user releases his or her finger from the white key 30, the weight portion 71 of the hammer member 70 is lowered to be brought into abutment with a lower cushion 27, and a jaw portion of the restricting projection 32 is brought into abutment with an upper cushion 28, thereby resulting in a state shown in FIG. 3A.

In addition, with the black key 40, when the player or user depresses the black key 40, the hammer member 80 rotates, whereby the player or user can depress the black key 40 while feeling a sensation of heaviness that the player or user feels when he or she plays a real piano, not an electronic keyboard instrument. As in the case of the weight portion 71 for the white key 30, the weight portion 81 for the relevant black key 40 is brought into abutment with an upper cushion 26 and a lower cushion 27 at an upper limit for a rising operation and a lower limit for a lowering operation of the hammer member 80, respectively.

When the white key 30 and the black key 40 are depressed, the upper surfaces of the switches 61 are depressed by the switch pressing portions 33, 43, whereby notes corresponding to the white key 30 and the black key 40 which are so depressed are made. When the white key 30 and the black key 40 are depressed, initially, the switch pressing portions 33, 43 are brought into abutment with the upper surfaces of back side portions of the switches 61. Then, the deforming portions 61*c* flex, and the bottom portions 61*a*1 of the back pressing portions 61*a* lower first. When the white key 30 and the black key 40 which are depressed become substantially horizontal, the switch pressing portions 33, 43 are brought into full abutment with the upper surfaces of the switches 61 over a length in the front-back direction FB of the key. Then, lower surface positions of the bottom portions 61*a*1, 61*b*1 of the back pressing portion 61*a* and the front pressing portion 61*b* become substantially the same, whereby the two switch contacts of the switches 61 are depressed simultaneously by lower surfaces of the bottom portions 61*a*1, 61*b*1, and notes corresponding to the keys depressed are made.

Further, the weights 100, 200 are provided in the white key 30 and the black key 40, respectively, as counterweights. The weights 100, 200 are intended to improve the key-depressing feeling felt by the player or user when he or she depresses the keys. That is, when the keys are depressed lightly, reaction forces relative to the hammer members 70, 80 are given to the tips of the fingers of the player or user to make the player or user feel light at the time of depressing the keys. On the other hand, when the keys are depressed strongly, the player or user can be made to feel heavy at the time of forcibly depressing the keys due to the inertial force produced by the weights 100, 200. The weights 100, 200 are both formed into a shape of a frustum of cone or pyramid. The weight 100 provided in the white key 30 has a shape of a frustum of cone. On the other hand, the weight 200 provided in the black key 40 has a shape of frustum of quadrangular pyramid. The weight 200 provided in the black key 40 is elongated in the front-back direction FB of the key.

Figure 5:
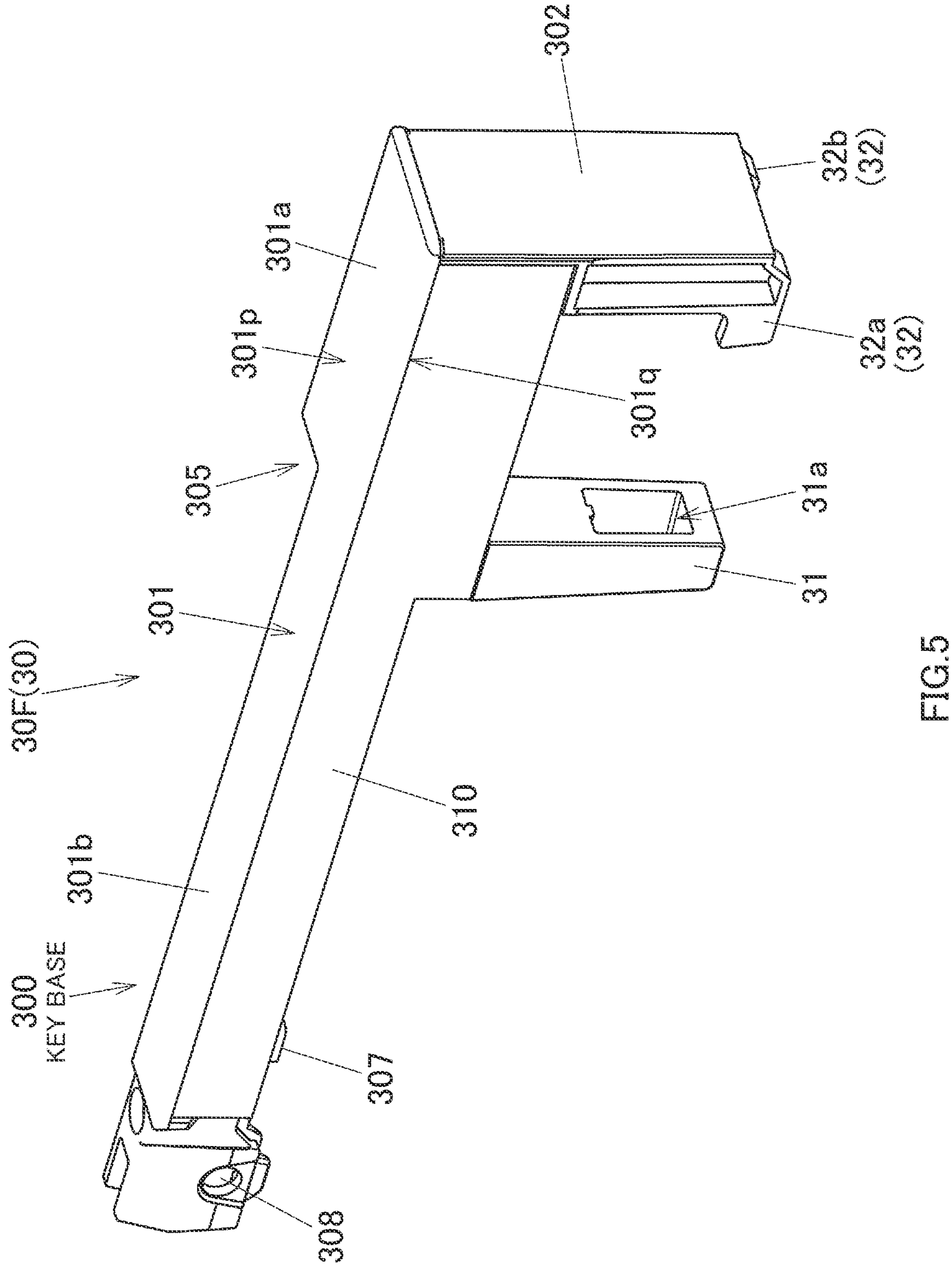
FIG. 5 is a perspective view showing a white key of the keyboard instrument according to the embodiment of the present disclosure.
Figure 6:
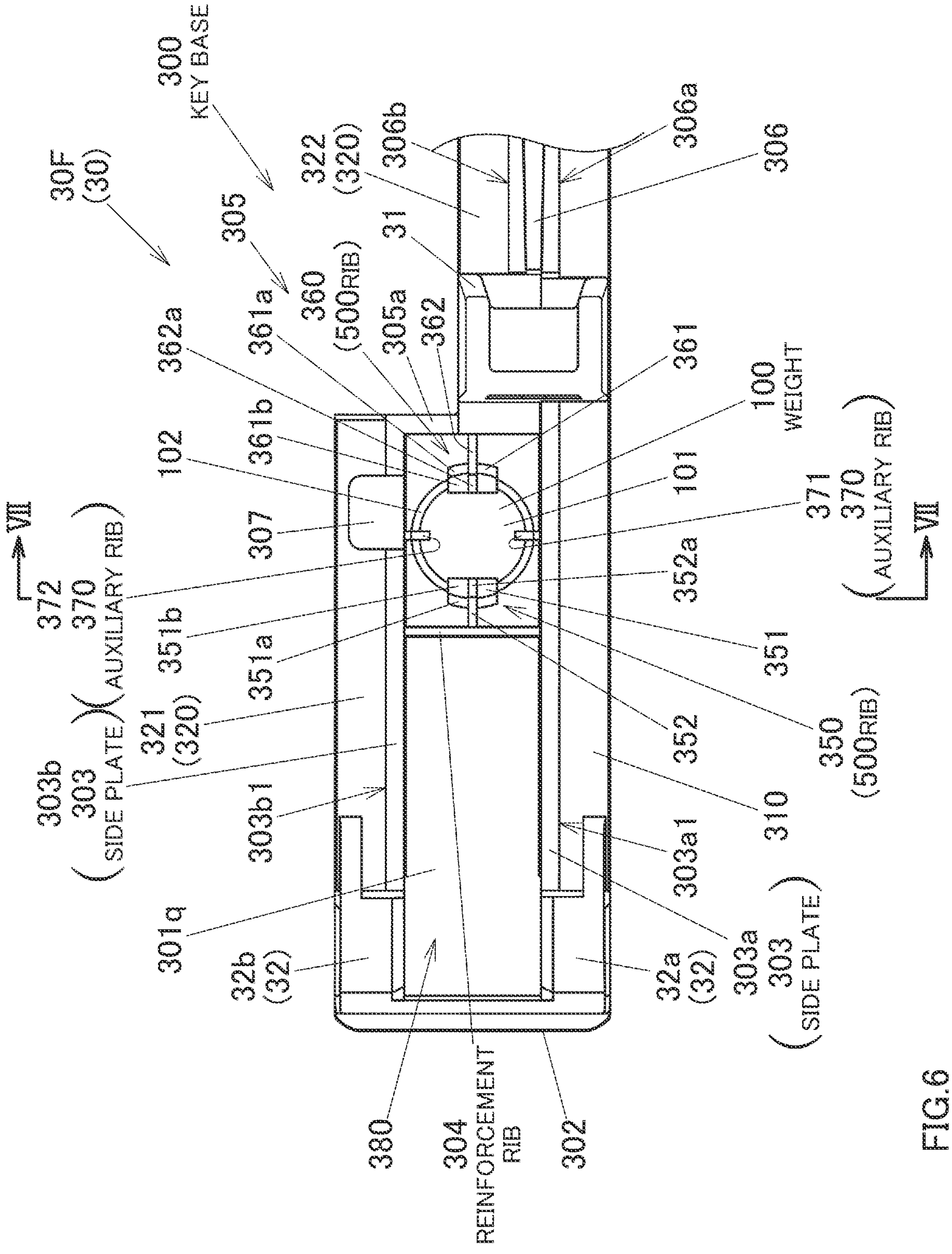
FIG. 6 is a partially enlarged bottom view of a wider portion and a portion near thereto of the white key of the keyboard instrument according to the embodiment of the present disclosure, as viewed from a lower surface side thereof.
Figure 7:
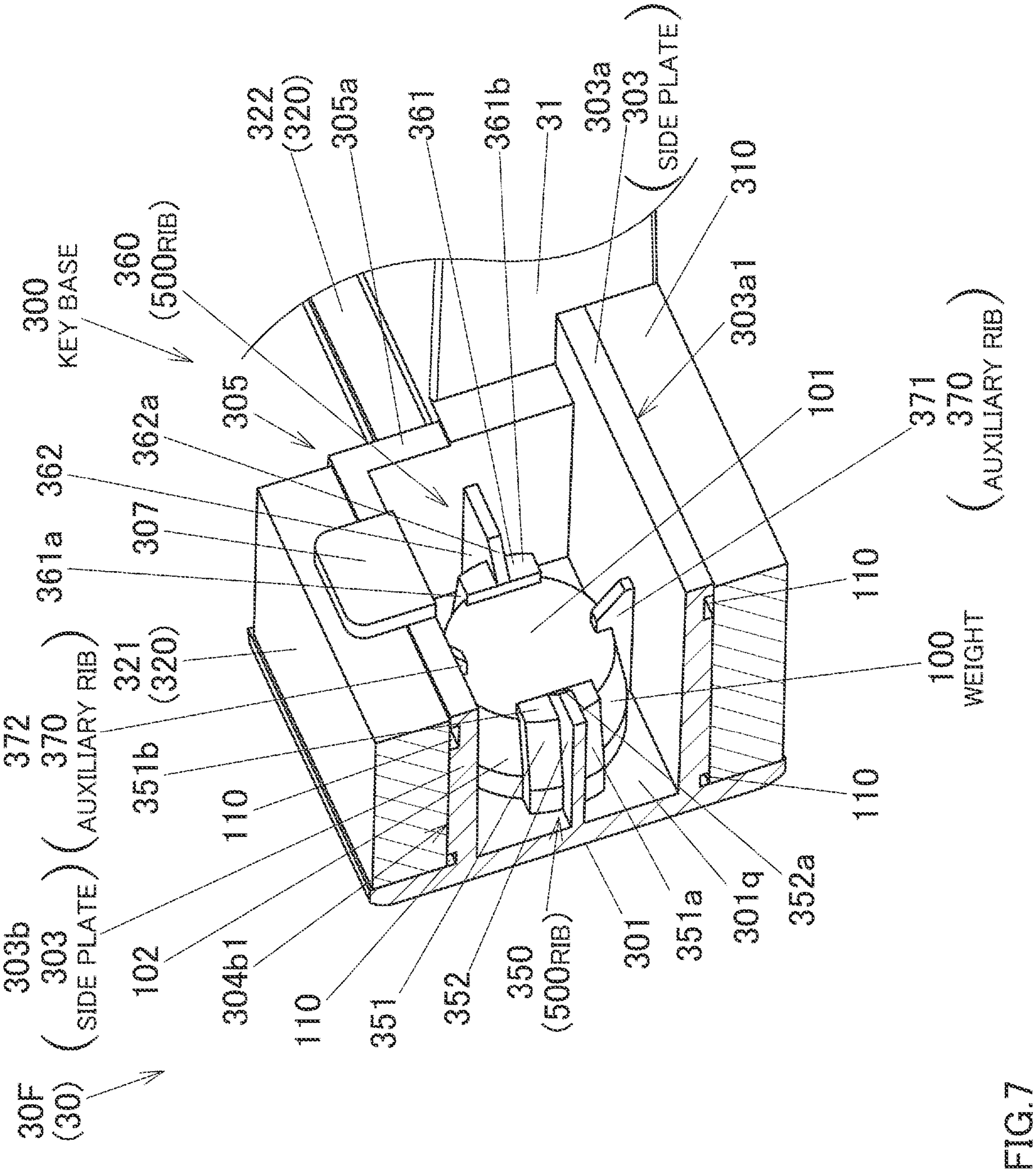
FIG. 7 is a partially sectional perspective view of the white key of the keyboard instrument according to the embodiment of the present disclosure, taken along a line VII-VII in FIG. 6.

An attaching portion of the weight 100 in the white key 30 will be described based on FIGS. 5 to 7. In FIGS. 5 to 7, a white F key 30F is illustrated as an example of the white key 30. As shown in FIG. 5, the white key 30 includes wood members 310, 320, which are attachment members provided individually on a left side L and a right side R of the white key 30, and a key base 300 (refer to FIGS. 6 and 7 for the wood member 320). The key base 300 includes a top plate 301 of which an upper surface 301*p* constituting a top surface is made into a key depressing surface. A step portion 305 is provided on a right side R of the top plate 301 of the key base 300. The step portion 305 constitutes a portion of the white key 30 which corresponds to the black key 40 when the relevant white key 30 is disposed in the keyboard 50. A portion of the top plate 301 which is situated further towards the front side F than the step portion 305 is made into a wider portion 301*a*, and a portion situated further towards the back side B than the step portion 305 is made into a narrower portion 301*b*.

A front plate 302 is provided at a front end portion of the top plate 301 in such a manner as to extend downwards towards the lower side Lo from a lower surface 301*q* of the front end portion of the top plate 301. The front plate 302 is disposed in such a manner that plate surfaces thereof are made to face the front-back direction FB and has a width substantially equal to that of the wider portion 301*a* of the top plate 301. The restricting projection 32 includes the left plate-shaped restricting projection 32*a* and the right plate-shaped restricting projection 32*b* which are provided on a back surface of the front plate 302.

As shown in FIGS. 6 and 7, the key base 300 includes side plates 303 (a left side plate 303*a*, a right side plate 303*b*) which are provided individually on a left side L and a right side R of the top plate 301 in such a manner as to extend perpendicularly downwards from a lower surface of the top plate 301. The side plates 303 are provided in such a manner as to correspond to the wider portion 301*a* of the top plate 301. The left side plate 303*a* of the side plates 303, which is provided on the left side L, and the right side plate 303*b* of the side plates 303, which is provided on the right side R, are provided in such a manner as to face each other.

The key base 300 includes a longitudinal plate 306 which is provided to a back side B of the step portion 305 in such a manner as to correspond to the narrower portion 301*b*. A side surface 303*a*1 of the left side plate 303*a* and a left side surface 306*a* of the longitudinal plate 306 constitute substantially a continuous surface. The wood member 310, which is configured as a single unit, is provided in such a manner as to extend over the side surface 303*a*1 of the left side plate 303*a* and the left side surface 306*a* of the longitudinal plate 306. On the other hand, the right side plate 303*b* connects to the longitudinal plate 306 at the step portion 305 via a connecting plate 305*a*, which intersects the right side plate 303*b* at right angles. A front wood member 321 of the wood member 320 is provided on a side surface 303*b*1 of the right side plate 303*b* on the front side F, and a back wood member 322 of the wood member 320 is provided on a right side surface 306*b* of the longitudinal plate 306 on the back side B.

As shown in FIG. 7, two recessed groove portions 110 are provided individually at upper and lower locations on each of the left side plate 303*a* and the right side pate 303*b*. An extra portion of an adhesive is stored in the recessed groove portions 110 in the case that such an extra portion is produced when the wood members 310, 320 are attached respectively to the side surface 303*a*1 of the left side plate 303*a* and the side surface 303*b*1 of the right side plate 303*b* with the adhesive. In addition, projecting plates 307 are provided in such a manner as to project horizontally outwards individually at a lower end of the right side plate 303*b* and a lower end of the longitudinal plate 306 at the back side B thereof. These projecting plates 307 constitute receiving portions for receiving the wood members 310, 320 which function to prevent the wood members 310, 320 from falling inside the keyboard instrument 10 in the even that the wood members 310, 320 come off to fall from the corresponding side surfaces. A rotational hole portion 308, which is rotatably supported on the support shaft 25*a*, is provided in a back end portion of the key base 300.

As shown in FIGS. 6 and 7, the weight 100 and ribs 500 for fixing the weight 100 are provided on the lower surface 301*q* of the top plate 301 of the key base 300. The ribs 500 include a first rib 350 and a second rib 360. Additionally, the key base 300 has auxiliary ribs 370 (a left auxiliary rib 371, a right auxiliary rib 372).

The first rib 350 and the second rib 360 of the ribs 500 are both disposed in the front-back direction FB on the lower surface 301*q* of the top plate 301. The ribs 500 (the first rib 350, the second rib 360) fix at least either of a front and a back of the weight 100 in the front-back direction FB of the key. Specifically speaking, the first rib 350 is provided at a front side F of the weight 100, and the second rib 360 is provided at a back side B of the weight 100. The first rib 350 and the second rib 360 have substantially hook-shaped holding portions 351, 361, respectively, which are provided in such a manner as to follow an external shape of the weight 100. The holding portions 351, 361 have respectively outer circumferential wall portions 351*a*, 361*a* which are provided in such a manner as to follow an outer circumferential surface 102 of the weight 100 and lower wall portions 351*b*, 361*b* which are provided to lie on a lower surface 101 of the weight 100 while being given a width which is substantially the same as that of the outer circumferential wall portions 351*a*, 361*a*. A back surface of the outer circumferential wall portion 351*a* and a front surface (a surface facing the weight 100) of the outer circumferential wall portion 361*a* are brought into abutment with the outer circumferential surface 102 of the weight 100. Upper surfaces (surfaces facing the weight 100) of the lower wall portions 351*b*, 361*b* are brought into abutment with the lower surface 101 of the weight 100.

In the case of the abutment of the ribs 500 with the lower surface 101 and the outer circumferential surface 102 of the weight 100, at least one of the first rib 350 and the second rib 360 of the ribs 500 only needs to be brought into abutment with the lower surface 101 and the outer circumferential surface 102. In addition, either of the holding portions 351, 361 only needs to be provided on at least either of the first rib 350 and the second rib 360.

Rib portions 352,362 are provided individually on a front surface of the outer circumferential wall portion 351*a* of the holding portion 351 and a back surface of the outer circumferential wall portion 361*a* of the holding portion 361 (the front surface and the back surface being surfaces situated opposite to or farther away from the weight 100). The rib portions 352, 362 are disposed on a center line of the weight 100 in the front-back direction FB of the key and are each provided in the form of a plate which is set upright downwards from the lower surface 301*q* of the top plate 301 with plate surfaces thereof disposed in such a manner as to be parallel to the front-back direction FB of the key. In other words, the ribs 500 (the rib portion 352, 362) are disposed on a vertical plane which is parallel to the center line of the weight 100 in the front-back direction FB of the key. The rib portion 352 of the first rib 350 is connected to a back surface of a reinforcement rib 304 which connects the left and right side plates 303 together at a front end thereof. The reinforcement rib 304 reinforces the side plates 303 in the key alignment direction LR. In this way, the first rib 350 connects with the reinforcement rib 304 which connects the left and right side plates 303 of the key base 300 together. The rib portion 362 of the second rib 360 connects to a front surface of the connecting plate 305*a* at a back end thereof. As shown in FIG. 7, facing corner portions of the rib portions 352, 362 are chamfered so as to be formed into chamfered portions 352*a*, 362*a*, respectively.

The key base 300 has auxiliary ribs 370 (a left auxiliary rib 371, a right auxiliary rib 372) for fixing the weight 100 from the key alignment direction LR. The auxiliary ribs 370 are each provided as a hook-shaped plate. The auxiliary ribs 370 are provided in such a manner that plate surfaces thereof intersect the rib portions 352, 362 at right angles (become parallel to the key alignment direction LR). Of the auxiliary ribs 370, a back side (a side opposite to or farther away from the weight 100) of the left auxiliary rib 371 connects to an inner surface (a right side surface) of the left side plate 303*a*. Of the auxiliary ribs 370, a back side (a side opposite to or farther away from the weight 100) of the right auxiliary rib 372 connects to an inner surface (a left side surface) of the right side plate 303*b*. The auxiliary ribs 370 hold the weight 100 from the lower surface 101 thereof at hook-shaped portions at distal end portions thereof so as to fix the weight 100 to the key base 300. The weight 100 is brought into abutment with the lower surface 301*q* of the top plate 301 on an upper surface 103 (refer to FIGS. 3A and 3B) thereof to be fixed thereto.

A space portion 380 is provided on a front side F of the reinforcement rib 304 (the first rib 350) in such a manner as to be surrounded by the reinforcement rib 304, the top plate 301, the left and right side plates 303, and the front plate 302. This space portion 380 constitutes a space which is used for assembly, for example, when an application nozzle is inserted to apply a grease to inner surfaces of the left restricting projection 32*a* and the right restricting projection 32*b* on which the white key guide portion 120 slides at the time of assembly of the keyboard instrument 10.

Figure 8:
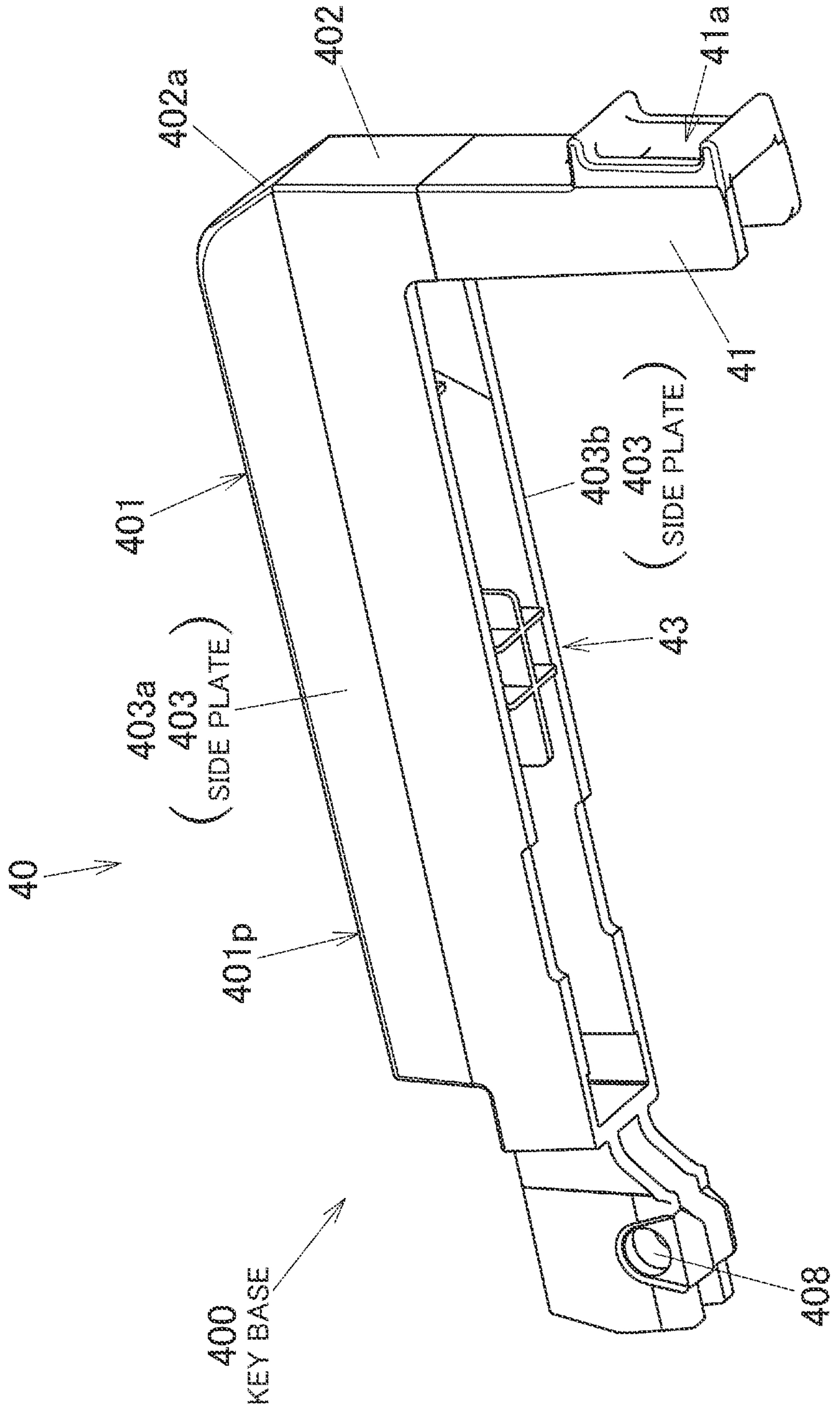
FIG. 8 is a perspective view showing a black key of the keyboard instrument according to the embodiment of the present disclosure.
Figure 9:
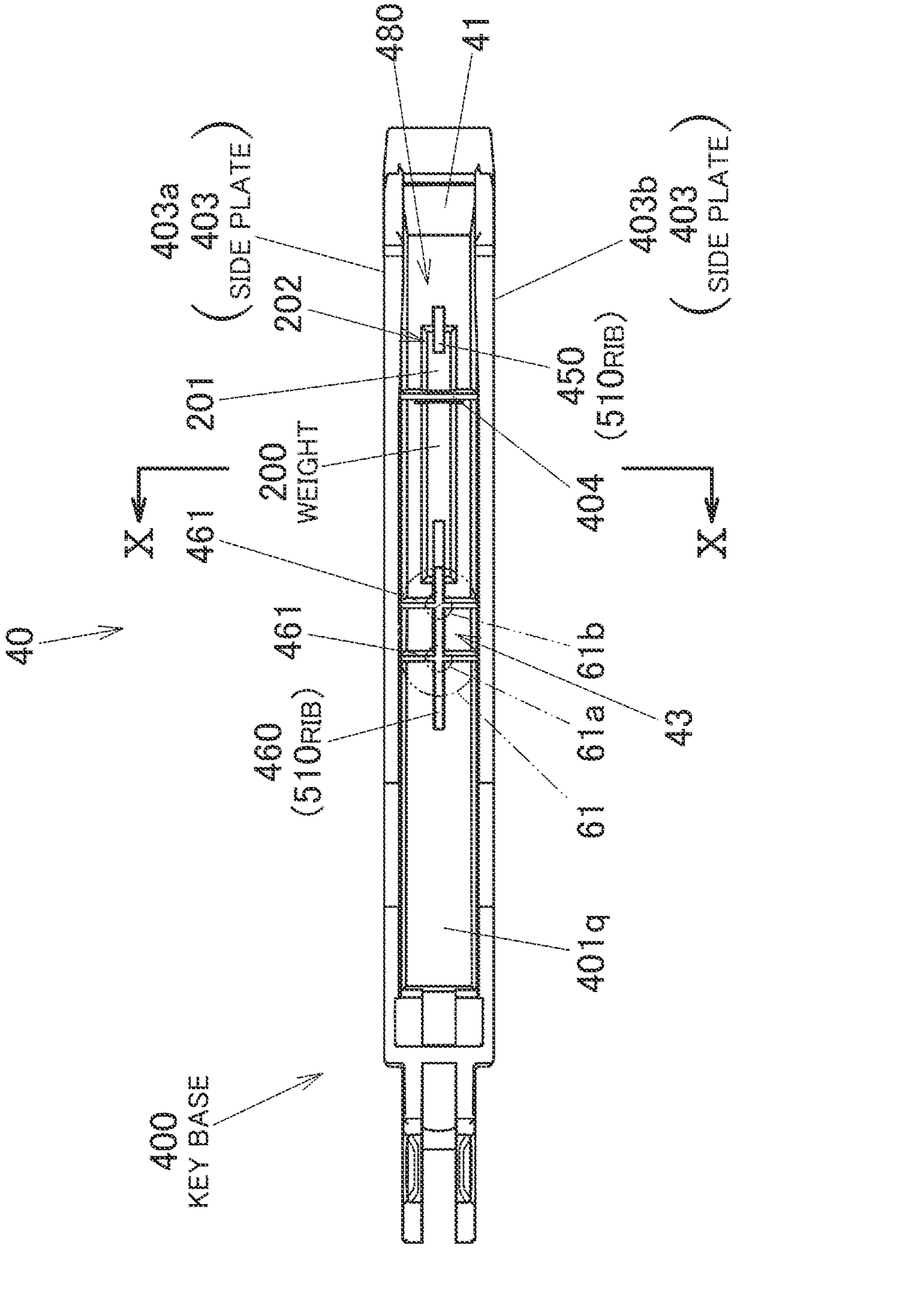
FIG. 9 is a bottom view of the black key of the keyboard instrument according to the embodiment of the present disclosure, as viewed from a lower surface side thereof.
Figure 10:
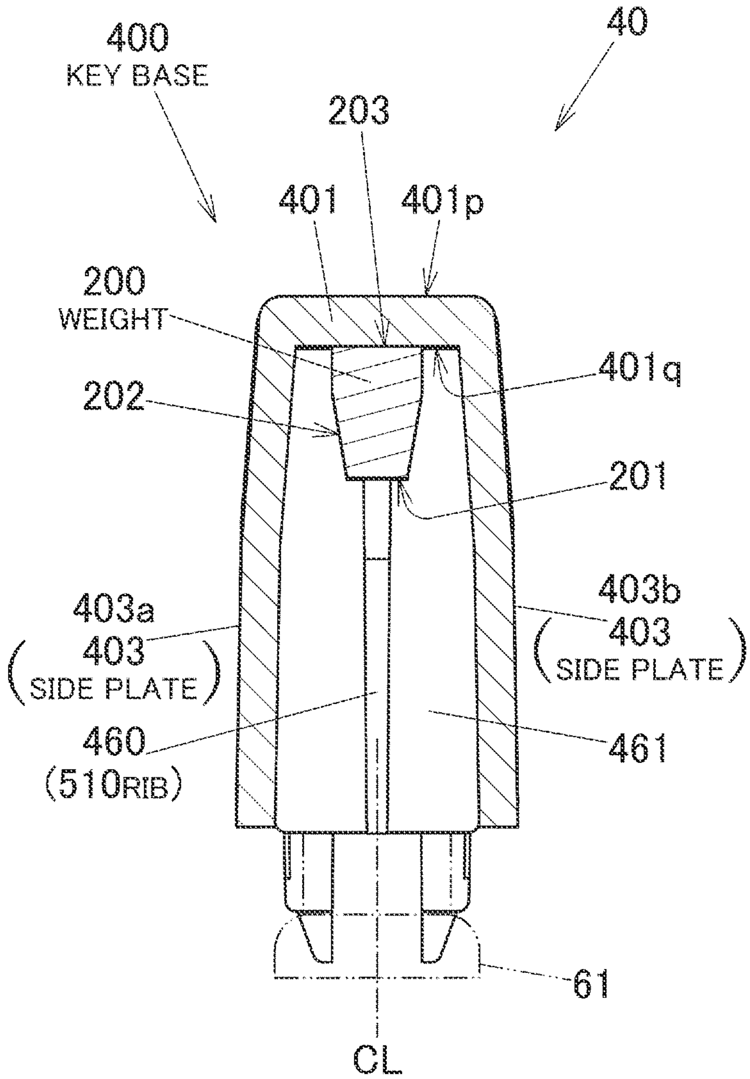
FIG. 10 is a sectional view of the black key of the keyboard instrument according to the embodiment of the present disclosure, taken along a line X-X in FIG. 9.
Figure 11A:
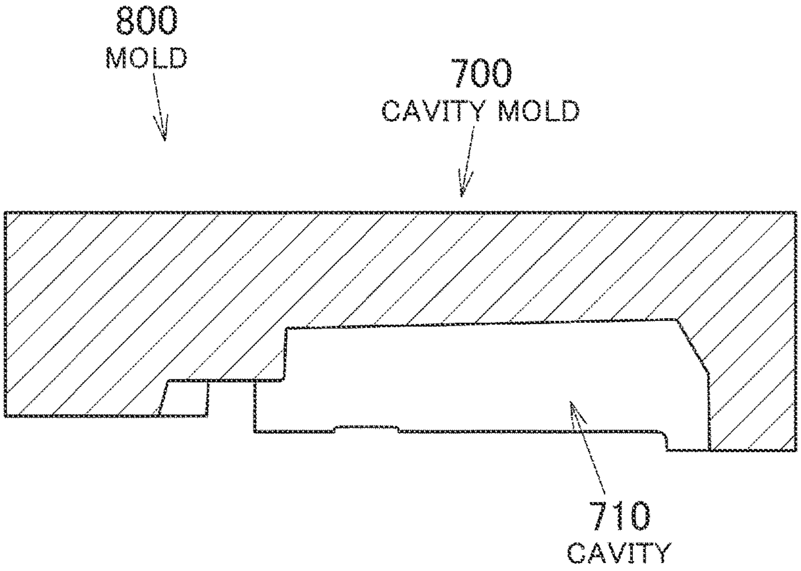
FIGS. 11A to 11C are schematic sectional views for explaining a molding method of molding a key base using a key base molding mold according to the embodiment of the present disclosure, showing a state in which, a weight is inserted.
Figure 11B:
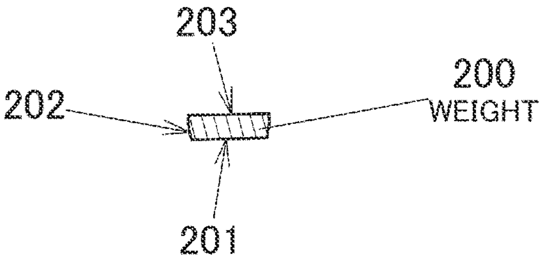
Figure 11C:
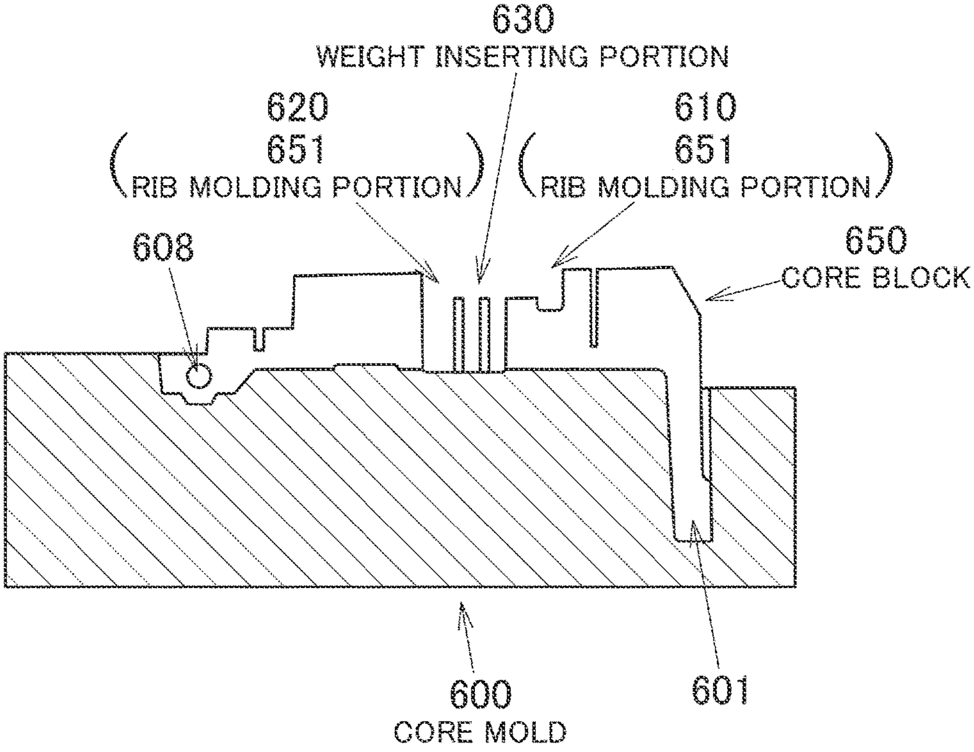

Referring to FIGS. 8 to 10, as well as FIG. 4, the black key 40 will be described. As shown in FIG. 8, the black key 40 has a key base 400 and the weight 200 (refer to FIG. 4). The black key 40 is formed substantially into a rectangular parallelepiped which is opened on a lower side Lo thereof and is elongated in the front-back direction FB of the key. The black key 40 includes a rotational hole portion 408 which is rotatably supported on the support shaft 25*a* at a back end portion thereof. The key base 400 includes a top plate 401 of which an upper surface 401*p* is made into a key depressing surface, a front plate 402 which is provided at a front side F of the top plate 401, and left and right side plates 403 (a left side plate 403*a*, a right side plate 403*b*) which are provided in such a manner as to extend perpendicularly downwards from left and right edge portions of the top plate 401, respectively. An upper portion of the front plate 402 is made into an inclined front plate 402*a*. The front plate 402 and portions of the side plates 403 at a front side F thereof extend towards the lower side Lo so as to define a hammer pressing portion 41.

As shown in FIGS. 9 and 10, the key base 400 has the weight 200 and ribs 510 (a first rib 450, a second rib 460), which are disposed individually at a front and a back of a lower surface 401*q* of the top plate 401 in the front-back direction FB of the key so as to fix the weight 200 in place.

As shown in FIG. 4, the first rib 450 of a plate shape which is disposed on the front side F is disposed in such a manner that plate surfaces thereof are made parallel to the front-back direction FB of the key and has a hook-shaped distal end portion (lower end portion). A side of the first rib 450 which faces the weight 200 is brought into abutment with a lower surface 201 and an outer circumferential surface 202 of the weight 200. On the other hand, the second rib 460 of a plate shape which is disposed on the back side B is disposed in such a manner that plate surfaces thereof are made parallel to the front-back direction FB of the key and includes a hook-shaped portion provided on a side (a front side F) thereof which faces the weight 200, whereby the second rib 460 is brought into abutment with the lower surface 201 and the outer circumferential surface 202 (refer to FIG. 9) of the weight 200. An upper surface 203 of the weight 200 is brought into abutment with the lower surface 401*q* of the top plate 401. In this way, the weight 200 is fixed to the key base 400 of the black key 40. In the case of the abutment of the ribs 510 with the lower surface 201 and the outer circumferential surface 202 of the weight 200, at least one of the first rib 450 and the second rib 460 of the ribs 510 only needs to be brought into abutment with the lower surface 201 and the outer circumferential surface 202. That is, also with the black key 40, either of the ribs 510 (the first rib 450, the second rib 460) fixes the weight 200 at either of the front and back thereof. Then, the ribs 510 (the first rib 450, the second rib 460) are disposed on a vertical plane which is parallel to a center line of the weight 200 in the front-back direction FB of the key.

As shown in FIG. 9, the second rib 460 includes two switch depressing ribs 461, which are made up of two plate-shaped ribs which intersect the second rib 460 at right angles. The switch depressing ribs 461 connect to the left and right side plates 403. The two switching depressing ribs 461 are disposed at an interval which matches an interval defined between centers of the back pressing portion 61*a* and the front pressing portion 61*b* of the switch 61. That is, as shown in FIG. 9, the switch depressing ribs 461 are disposed at the centers of the back pressing portion 61*a* and the front pressing portion 61*b*. In addition, as shown in FIG. 10, the second rib 460 and the switch 61 are disposed in such a manner that a center of the second rib 460 in a thickness direction thereof matches a center line CL of the switch 61 in a left-right direction thereof (the center line CL also constituting a center line of the weight 200). As a result, portions (two portions) where the two switch depressing ribs 461 intersect the second rib 460 at right angles are disposed at center axes of the circular holes defining the rear pressing portion 61*a* and the front pressing portion 61*b*. In this way, the second rib 460 (the switch depressing ribs 461) is provided in such a manner as to correspond to the switch 61. A length of the second rib 460 defined in the front-back direction FB of the key is made sufficiently longer than a length in the front-back direction FB of the key on the upper surface of the switch 61 with which the second rib 460 is brought into abutment.

Additionally, a reinforcement rib 404 is provided between the first rib 450 and the second rib 460 in order to reinforce the side plates 403 in the key alignment direction LR. The reinforcement rib 404 is a plate-shaped rib which is provided in such a manner as to intersect the first rib 450 and the second rib 460 at right angles so as to connect the left side plate 403*a* and the right side plate 403*b* together. The reinforcement rib 404 is provided in such a manner as to extend transversely over the weight 200 while being brought into abutment with the outer circumferential surface 202 and the lower surface 201 of the weight 200.

A space 480 is provided to a front side F of the first rib 450. This space portion 480 can be used for assembly, for example, when an application nozzle is inserted to apply a grease between the sliding black key guide portion 220 and the left and right side plates 403 which extend towards the hammer pressing portion 41 and over which the black key guide portion 220 is configured to slide at the time of assembly of the keyboard instrument 10.

Next, a molding method of molding the key base 400 of the black key 40 using a mold 800 will be described based on FIGS. 11A to 13C. The mold 800 includes a core mold 600 and a cavity mold 700. The key base 400 is molded from a resin material through injection molding using the cavity 800. The core cavity 600 includes a substantially plate-shaped core block 650. The core block 650 includes a hammer pressing portion molding portion 601 for molding the hammer pressing portion 41, a rotational hole portion molding portion 608 for molding the rotational hole portion 408, a weight inserting portion 630, and the like.

The weight inserting portion 630 is provided as a recess where to place the weight 200 in such a state that of bases of the weight 200 having a shape of a frustum of quardrangular pyramid, a base having a larger surface area (the upper surface 203) is made to face outwards (upwards). The weight inserting portion 630 includes a first rib molding portion 610 and a second rib molding portion 620 which make up a rib molding portion 651. The first rib molding portion 610 and the second rib molding portion 620 are disposed in such a manner that the first rib molding portion 610 is disposed forwards and the second rib molding portion 620 is disposed backwards in the front-back direction FB of the key. The first rib molding portion 610 and the second rib molding portion 620 are disposed to face each other.

The first rib molding portion 610 and the second rib molding portion 620 are each provided as a groove which extends over an area ranging from the outer circumferential surface 202 to the other base (the lower surface 201) having a smaller surface area of the weight 200. A molten resin is introduced into the first rib molding portion 610 and the second rib molding portion 620 so as to mold the first rib 450 and the second rib 460, respectively.

The cavity mold 700 includes a cavity 710 which is provided as a recess matching an external shape of the black key 40.

Figure 12:
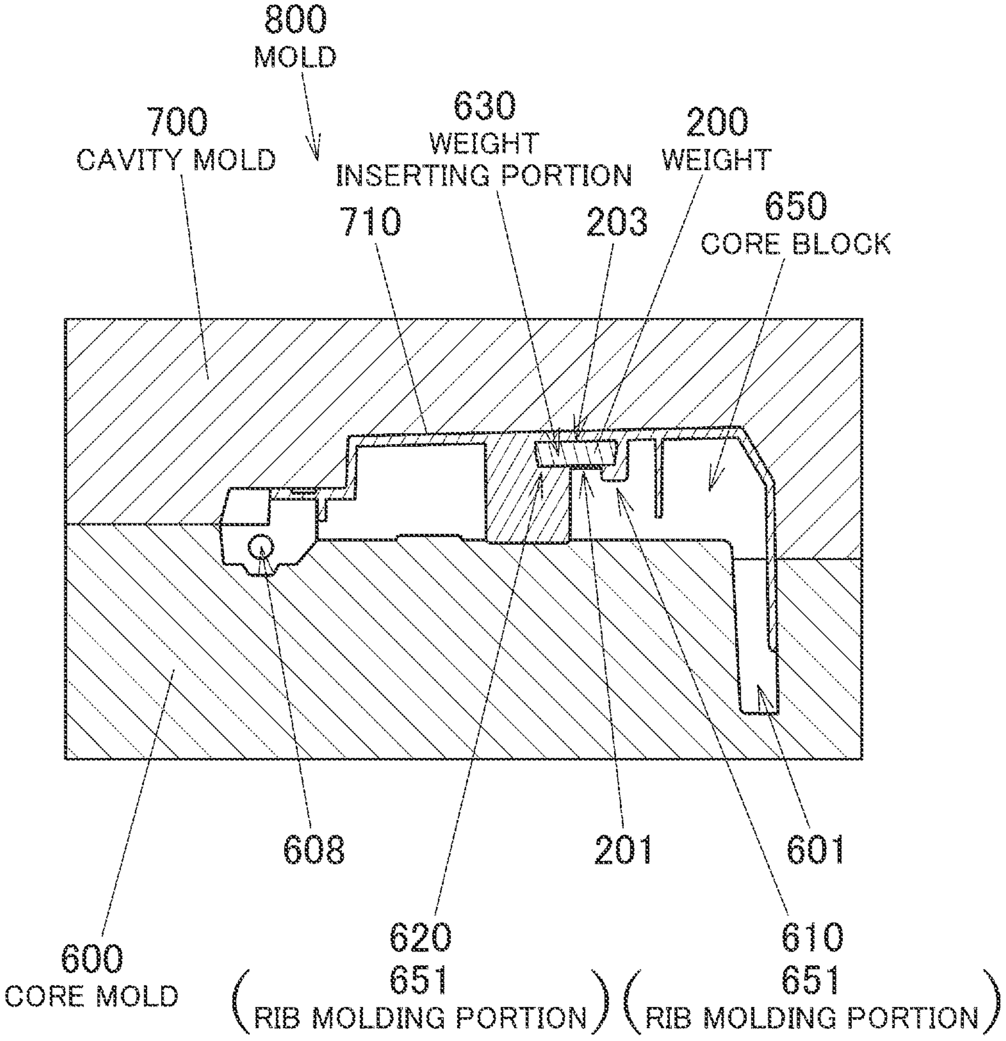
FIG. 12 is a schematic sectional view for explaining the molding method of molding a key base using the key base molding mold according to the embodiment of the present disclosure, showing a state in which, an injection molding is being performed with the mold clamped.

In the molding method of molding the key base 400 through injection molding using the mold 800, firstly, as show in FIG. 12, a step is performed in which the weight 200 is inserted in the weight inserting portion 630 provided in the core mold 600 of the mold 800 to be disposed in place therein. The weight 200 is so inserted from the lower surface 201 (the base having the smaller surface area of the shape of the frustum of quadrangular pyramid). As a result, even though there is a slight deviation in position between the weight 200 and the weight inserting portion 630, the weight 200 and the weight inserting portion 630 are automatically aligned in position with each other by the inclined outer circumferential surface 202 of the weight 200, whereby the weight 200 is well disposed in the weight inserting portion 630.

Then, a step is performed in which the core mold 600 and the cavity mold 700 are clamped together. As this occurs, the core block 650 is inserted into the cavity 710. Subsequently, a step is performed in which a molten resin is injected into the mold 800 so clamped so as to mold the key base 400 including the first rib 450 and the second rib 460 which are disposed forwards and backwards in the front-back direction FB of the key to fix the weight 200.

Figure 13A:
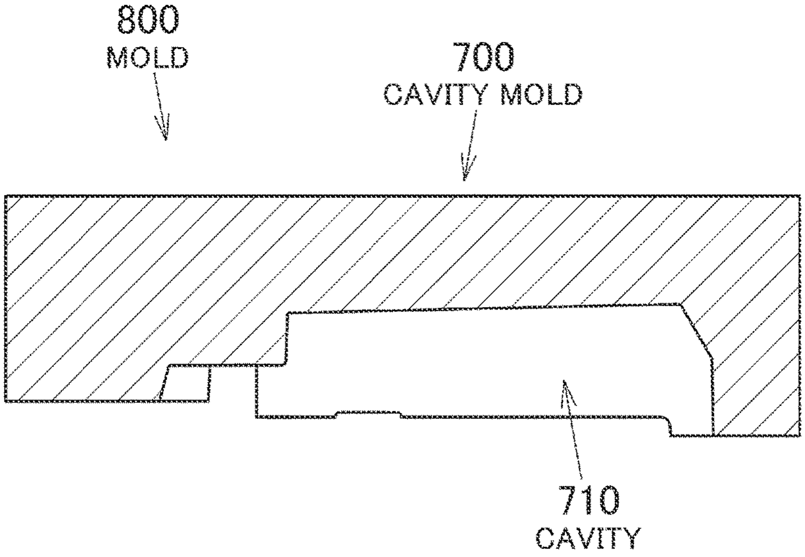
FIGS. 13A to 13C are schematic sectional views for explaining the molding method of a key base using the key base molding mold according to the embodiment of the present disclosure, showing a state in which, a molded product has been removed by opening the mold.
Figure 13B:
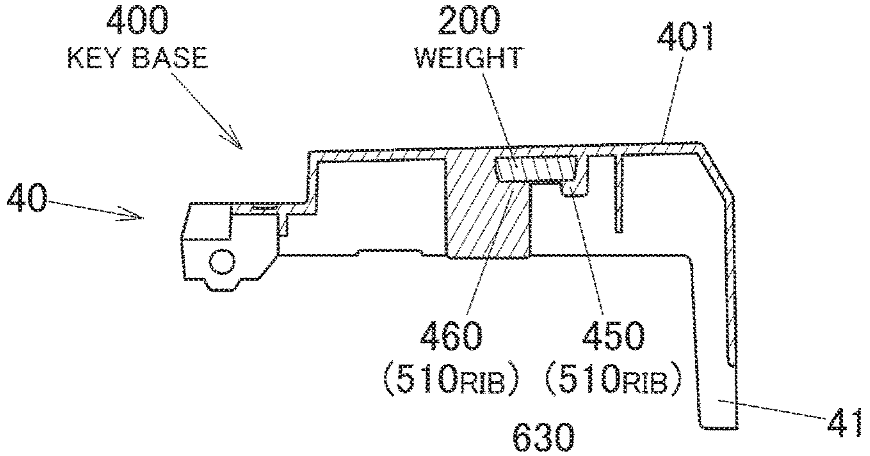
Figure 13C:
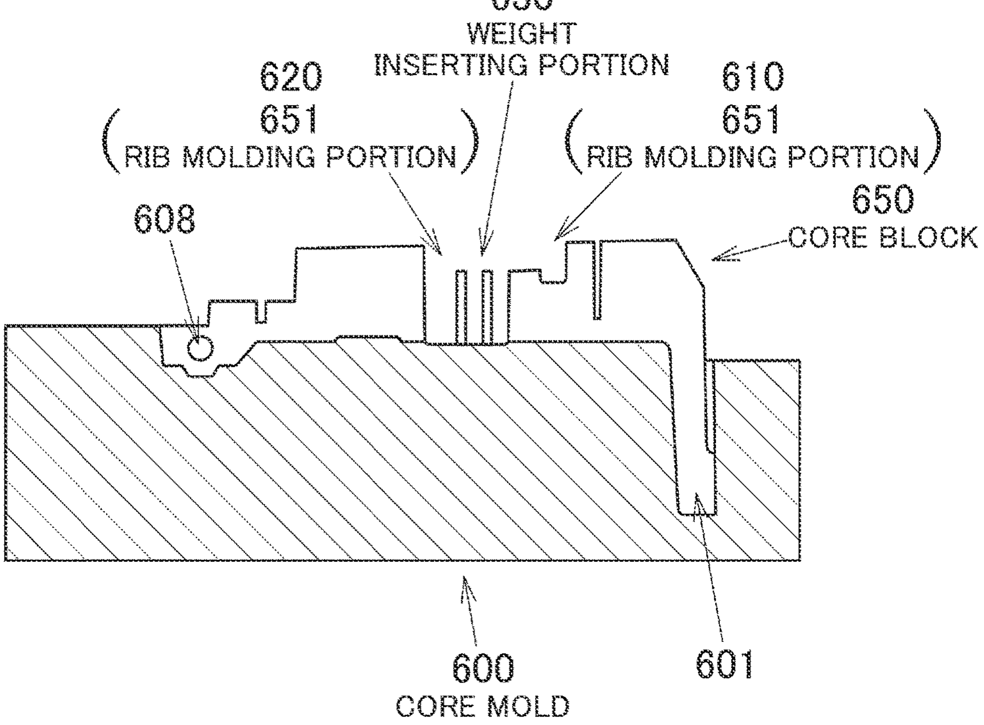

Next, as shown in FIGS. 13A to 13C, a molded product removing step is performed in which the cavity mold 700 and the core mold 600 are opened to remove a molded product, that is, the key base 400. In this way, the weight 200 is attached to the key base 400 as through insert molding. Similarly, the white key 30 including the weight 100 can be molded as through insert molding.

For disposal of the white keys 30 and the black keys 40, the key bases 300, 400 which are molded from the resin material can be separated from the weights 100, 200 which are made of metal as below. With the white key 30, for example, the reinforcement rib 304 is cut at, for example, two locations with a pair of cutting nippers and is then collapsed to the front side F, whereby the weight 100 can be removed. Alternatively, the rib portions 352, 362 of the first rib 350 and the second rib 360 and/or the auxiliary ribs 370 are cut with a pair of cutting nippers to be removed, or the holding portion 351 is caused to collapse in the left-right direction, whereby the weight 100 can be removed.

In the case of the black key 40, similarly, portions of the first rib 450 and the second rib 460 which lie near to the weight 200 are cut to be removed with a pair of cutting nippers or are caused to collapse in the left-right direction so as to deviate from the weight 200, whereby the weight 200 can be removed.

With the black key described in JP-A-2008-268654 described before, the resin material forming the key base is kept tightly adhering to the upper surface, the left and right surfaces, the front and back surfaces, and the lower surface of the weight excluding the portion corresponding to the opening portion. As a result, the weight is never easily removed from the key base. However, for disposal of the keyboard instrument, the weight made of metal often needs to be separated from the key base which is made from the resin material. For separation of the metal weight from the resin key base, the resin material adhering to the circumference of the weight needs to be scraped off for removal, which is not easy.

On the other hand, according to the embodiment of the present disclosure, the keyboard instrument 10 includes the weights 100, 200 and the key bases 300, 400 which include the ribs 500, 510 for fixing the weights 100, 200.

As a result, the weights 100, 200 can be attached to the key bases 300, 400, respectively, in an ensured fashion, and the weights 100, 200 can be removed from the corresponding key bases only by cutting the ribs 500, 510 (the first ribs 350, 450 or the second ribs 360, 460). Thus, the keyboard instrument 10 can be provided which includes the keyboard 50 which facilitates the separation of the resin material from the metal material for disposal.

The ribs 500, 510 fix the weights 100, 200 at, at least, either of the front and back thereof in the front-back direction FB of the key. As a result, the weights 100, 200 can be attached to the key bases 300, 400 respectively in a more ensured fashion.

The ribs 500, 510 are disposed on the vertical planes parallel to the center lines of the weights 100, 200 in the front-back direction FB of the key. As a result, the weights 100, 200 can be fixed with good balance, whereby the weights 100, 200 can preferably be used as counterweights.

In addition, the key base 300 has the auxiliary ribs 370 which fix the weight 100 from the key alignment direction LR. As a result, the weight 100 can be attached to the key base 300 in a much more ensured fashion.

The rib 500 (the first rib 350) connects to the reinforcement rib 304 which connects together the left and right side plates 303 of the key base 300. As a result, the weight 100 can easily be removed also by cutting the reinforcement rib 304.

The ribs 500, 510 include the ribs 510 provided on the black key 40. The ribs 510 provided on the black key 40 include the second rib 460 (the switch depressing rib 461) which is the rib disposed in such a manner as to correspond to the switch 61 for detecting a key depression. As a result, the switch 61 can be depressed in an ensured fashion.

The molding method of molding the key bases 300, 400 includes the step of inserting the weights 100, 200 in the weight inserting portion 630 provided in the core mold 600 of the mold 800 to be disposed in place therein, the step of clamping together the core mold 600 and the cavity mold 700 of the mold 800, and the step of molding the key bases 300, 400 including the ribs 500, 510 for fixing the weights 100, 200 by injecting the molten resin into the mold 800 so clamped.

As a result, the molding method of molding the key bases 300, 400 can be provided which facilitates the removal for separation of the weights 100, 200 only by cutting the ribs 500, 510 (the first ribs 350, 450, and the second ribs 360, 460) while enabling the weights 100, 200 to be fixed in an ensured fashion.

The mold 800 for molding the key bases 300, 400 has the cavity 710 provided in the cavity mold 700 and the core block 650 provided in the core mold 600. The core block 650 has the weight inserting portion 630 which includes the rib molding portion 651, and the weight inserting portion 630 is provided as the recess having the shape of the frustum of cone or pyramid with the base having the wider surface area disposed outwards. The rib molding portion 651 is provided as the groove extending from the outer circumferential surface to the base having the smaller surface area of the weight inserting portion 630 having the shape of the frustum of cone or pyramid.

As a result, the molding method of molding the key bases 300, 400 can be provided which facilitates the removal for separation of the weights 100, 200 only by cutting the ribs 500, 510 (the first ribs 350, 450, and the second ribs 360, 460) while enabling the weights 100, 200 to be fixed in an ensured fashion.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A keyboard instrument comprising:

a key comprising:

a weight; and a key base comprising a top plate and at least one rib configured to fix the weight by holding the weight from below in such a state that the weight is kept in abutment with a lower surface of the top plate, wherein the at least one rib is at least one rib provided on a black key, and wherein the at least one rib provided on the black key is configured to come into contact with a switch configured to detect a key depression when the black key is depressed.

2. The keyboard instrument according to claim 1, wherein the at least one rib comprises a first rib and a second rib, wherein the key base further comprises left and right side plates which are connected to and extend downward from the top plate, and wherein the weight, the first rib, and the second rib are provided between the left and right side plates.

3. The keyboard instrument according to claim 1, wherein the at least one rib comprises a first rib, and wherein the first rib is configured to fix the weight at one of a front and a back of the weight in a front-back direction of the key.

4. The keyboard instrument according to claim 3, wherein the at least one rib further comprises a second rib, and wherein the second rib is configured to fix the weight at the other of the front and the back of the weight in the front-back direction of the key.

5. The keyboard instrument according to claim 1, wherein the at least one rib extends along a vertical plane which is parallel to a center line of the weight in a front-back direction of the key.

6. The keyboard instrument according to claim 1, wherein the key base further comprises an auxiliary rib which extends along an alignment direction of the key and which is configured to fix the weight by holding the weight from below in such a state that the weight is in abutment with the lower surface of the top plate.

7. The keyboard instrument according to claim 1, wherein the key base further comprises left and right side plates which are connected to and extend downward from the top plate, and wherein the at least one rib connects to a reinforcement rib which connects the left and right side plates to each other.

8. The keyboard instrument according to claim 1, wherein the key base further comprises left and right side plates which are connected to and extend downward from the top plate, wherein the at least one rib provided on the black key comprises a first switch depressing rib connecting to the left and right side plates and a second switch depressing rib configured to fix a back of the weight in a front-back direction of the black key, the first switch depressing rib and the second switch depressing rib being provided in such a manner as to intersect each other at right angles, and wherein a portion where the first plate-shaped switch depressing rib and the second switch depressing rib intersect each other at right angles is configured to come into contact with the switch when the black key is depressed.

9. A key base molding method comprising:

inserting a weight in a weight inserting portion provided in a core mold of a mold to dispose the weight in place in the weight inserting portion;

clamping the core mold and a cavity mold of the mold together; and injecting a molten resin into the mold having been clamped to thereby mold a key base comprising a rib which extends in a vertical direction and which fixes the weight.

10. A key base molding mold comprising:

a cavity provided in a cavity mold; and a core block provided in a core mold, wherein the core block comprises a weight inserting portion comprising a rib molding portion, wherein the weight inserting portion is formed into a recess having a shape of a frustum in which a base side having a larger surface area is disposed outwards of the recess, and wherein the rib forming portion is formed into a groove extending from an outer circumferential surface of the weight inserting portion which has the shape of the frustum to a base side having a smaller surface area.

* * * * *